(12) United States Patent
Tanaka et al.

(10) Patent No.: US 6,276,626 B1
(45) Date of Patent: Aug. 21, 2001

(54) SEAT BELT RETRACTOR

(75) Inventors: Hiroshi Tanaka, Ibaraki; Masao Nishikawa, Settsu, both of (JP)

(73) Assignee: Ashimori Kogyo Kabushiki Kaisha (JP)

( * ) Notice: Subject to any disclaimer, the term of this patent is extended or adjusted under 35 U.S.C. 154(b) by 0 days.

(21) Appl. No.: 09/399,656

(22) Filed: Sep. 21, 1999

Related U.S. Application Data

(63) Continuation of application No. PCT/JP99/00465, filed on Feb. 3, 1999.

(30) Foreign Application Priority Data

Feb. 5, 1998 (JP) .................................................. 10-041209

(51) Int. Cl.[7] .................................................. B60R 22/28
(52) U.S. Cl. .......................................................... 242/379.1
(58) Field of Search ........................ 242/379.1; 280/805; 297/470, 471, 472

(56) References Cited

U.S. PATENT DOCUMENTS

| | | | | |
|---|---|---|---|---|
| 4,322,046 | * | 3/1982 | Tanaka et al. ..................... | 242/379.1 |
| 5,887,814 | * | 3/1999 | Matsuki et al. .................... | 242/379.1 |
| 5,938,135 | * | 8/1999 | Sasaki et al. ...................... | 242/379.1 |
| 5,967,441 | * | 10/1999 | Kohlndorfer et al. ............. | 242/379.1 |

* cited by examiner

*Primary Examiner*—John M. Jillions
(74) *Attorney, Agent, or Firm*—Morrison Law Firm

(57) ABSTRACT

In seat belt retractor, a coupling mechanism is provided that allows torsional deformation of spindle shaft when a vehicle emergency occurs until the torsional deformation rotation of the left end of spindle shaft with respect to the part near its right end reaches a prescribed value, and when the torsional deformation rotation reaches the prescribed value, it couples the part near the right end of spindle shaft and winding drum so that they cannot rotate relative to each other, and the composition has been made such that when a vehicle emergency occurs, the kinetic energy of the passenger is absorbed and ultimately the passenger is securely restrained by the webbing.

6 Claims, 7 Drawing Sheets

← LEFT SIDE

SEAT BELT RETRACTOR

This application is a continuation of PCT/JP99/00465, filed Feb. 3, 1999, published as WO99/39943 on Aug. 12, 1999.

BACKGROUND OF THE INVENTION

This invention concerns a seat belt retractor, in particular, it concerns a seat belt retractor made so that in a vehicle emergency it absorbs the energy imposed on a passenger by the torsional deformation of the spindle shaft, which functions as a torsion bar, and finally holds the passenger securely in the webbing.

BACKGROUND TECHNOLOGY

Heretofore in a seat belt retractor mounted on a vehicle, when there is a vehicle emergency such as a vehicle collision, an emergency locking mechanism locks the winding drum so that it cannot rotated in the direction by which the webbing would be pulled out, preventing the webbing from being pulled out of the winding drum.

But when the deceleration of the vehicle becomes very high in a vehicle emergency, it is undesirable that the load that a passenger receives from the webbing should become very large. Thus in recent seat belt retractors, an emergency locking mechanism causes the winding drum to get into a roughly locked state, and when the load acting on the webbing becomes large, the energy is absorbed by an energy absorption means while rotation of the winding drum is allowed, thus easing the impact that acts on the passenger.

For example, Japanese Laid-open Patent Publications No. 7-277136 and No. 7-101310 disclose a seat belt retractor in which a deformation member as the energy absorption means is provided around the outside surface of the winding drum. In this seat belt retractor, during a vehicle emergency the winding drum is locked nonrotatably by an emergency locking mechanism, and when a large load acts on the webbing, the deformation member deforms in its diameter-shrinking direction, thus absorbing the energy by the deformation. But a seat belt retractor of this type has a complex structure and is troublesome to assembly.

Meanwhile, Japanese Laid-open Patent Publications No. 6-156884 discloses a seat belt retractor that employs a torsion bar as the energy absorption means. In this seat belt retractor, the torsion bar goes through the winding drum, and one end of it is coupled to the winding drum so that they cannot rotate relative to each other.

A head part is formed on the other end of the torsion bar, and in the state in which this head part is locked nonrotatably by the emergency locking mechanism during a vehicle emergency, when a prescribed load (for example, 4 kN) acts on the webbing, one end of the torsion bar rotates together with the drum, the torsion bar is torsionally deformed, and the energy is absorbed through this torsional deformation. A seat belt retractor that employs this torsion bar is superior in that it has a simple structure and is easy to assemble, and its energy absorption performance is stable and highly reliable.

But with the seat belt retractor of Japanese Laid-open Patent Publications No. 6-156884, when a vehicle emergency occurs, the emergency locking mechanism locks only the head part of the torsion bar, not the end of the torsion bar, so even if a very great load acts on the webbing, rotation of the winding drum is not restricted, hence the torsion bar continues to undergo torsional deformation, and there is risk that the extension of the webbing will exceeds its critical value or that the torsion bar will break, losing the function of restraining the body. In particular, it will easily break when the torsion bar undergoes repeated torsional deformation when, for example, the vehicle, like a billiard ball, collides with one obstruction after another.

The purpose of this invention is, in a seat belt retractor equipped with a spindle shaft that functions as a torsion bar, to absorb the kinetic energy of the passenger during a vehicle emergency and ultimately to securely restrain the passenger with the webbing.

OBJECTS AND SUMMARY OF THE INVENTION

Disclosure of the Invention

The seat belt retractor of this invention — in a seat belt retractor that has a winding drum onto which the webbing winds and a spindle shaft whose end engages with the winding drum to prevent their mutual rotation and which functions as a torsion bar, made so as to absorb energy by torsional deformation of the spindle shaft during a vehicle emergency — has a coupling mechanism whereby at the time of a vehicle emergency, torsional deformation of the spindle shaft is allowed until the torsional deformation rotation of one end of the spindle shaft with respect to the part near the other end reaches a prescribed value, and when the torsional deformation rotation reaches the prescribed value, the part near the other end of the spindle shaft and the winding drum are coupled nonrotatably with respect to each other.

The prescribed value of torsional deformation rotation is a value at which the spindle shaft does not break and is set to a value whereby the passenger does not reach the steering wheel due to the extension of the webbing due to the torsional deformation of the spindle shaft. The load that acts on the passenger from the webbing when the spindle shaft undergoes torsional deformation can be appropriately set by appropriately designing the spindle shaft of the right shape and material, etc.

In this seat belt retractor, one end of the spindle shaft engages with the winding drum so that they cannot rotate with respect to each other, and thus in a vehicle emergency the rotation of the other end of the spindle shaft is locked by some sort of emergency locking mechanism, and when a large load, for example 4 kN or more, acts on the webbing, the winding drum rotates together with the one end of the spindle shaft, which torsionally deforms, absorbing energy by its torsional deformation. Thereafter, when the torsional deformation rotation reaches a prescribed value, the part near the other end of the spindle shaft and the winding drum are coupled by a coupling mechanism so that they cannot rotate relative to each other, the winding drum no longer rotates, extension ofthe webbing from the winding drum is prevented, and the passenger is securely restrained by the webbing.

Therefore, if a very large load acts on the webbing during a vehicle emergency, or even if the vehicle collides multiple times and the spindle shaft undergoes repeated torsional deformation, the kinetic energy of the passenger is absorbed, breakage of the spindle shaft is surely prevented, and finally the passenger can be securely restrained by the webbing, thus making it possible to surely prevent secondary impact of the passenger with the steering wheel or windshield and ensuring the safety of the passenger.

The seat belt retractor of another mode of this invention has—in a seat belt retractor that absorbs energy by the torsional deformation of a torsion bar in a vehicle emergency—a winding drum on which the webbing is wound; a spindle shaft that is positioned to pierce this winding drum, and whose one end engages with the winding drum so that they cannot rotate relative to each other, and that has a torsion bar part; an emergency locking means that nonrotatably locks the part near the other end of the spindle shaft when a vehicle emergency occurs; and a coupling mechanism that, following operation of the emergency locking means, causes the winding drum and one end of the spindle shaft to rotate integrally by the tension acting on the webbing and allows torsional deformation of the spindle shaft until the torsional deformation rotation of one end of the spindle shaft with respect to the part near the other end in the webbing pull-out direction reaches a prescribed value, and, when the torsional deformation rotation reaches the prescribed value, couples the part near the other end of the spindle shaft and the winding drum so that they cannot rotate relative to each other.

As stated above, the prescribed value of the torsional deformation rotation is a value at which the spindle shaft does not break and is set to a value whereby the passenger does not reach the steering wheel due to the extension of the webbing due to the torsional deformation of the spindle shaft. Also, the load that acts on the passenger from the webbing when the spindle shaft undergoes torsional deformation is as stated above.

In this seat belt retractor, the part near the other end of the spindle shaft is locked nonrotatably by the emergency locking mechanism when a vehicle emergency occurs, and when a large load, for example 4 kN or more, acts on the webbing, the winding drum rotates together with the one end of the spindle shaft, whose torsion bar part torsionally deforms, absorbing energy by its torsional deformation. Thereafter, when the torsional deformation rotation reaches the prescribed value, the part near the other end of the spindle shaft and the winding drum are coupled by a coupling mechanism so that they cannot rotate relative to each other, the winding drum no longer rotates, extension of the webbing from the winding drum is prevented, and the passenger is securely restrained by the webbing. With this seat belt retractor, as stated above, the kinetic energy of the passenger is absorbed, secondary impact of the passenger with the steering wheel or windshield is surely prevented, and the safety of the passenger is ensured.

Here, in the aforesaid seat belt retractor, it is desirable to have in the coupling mechanism a threaded-connection mechanism having female threading formed on one side of the part near the other end of the spindle shaft and the winding drum, and male threading formed on the other side that screws into the female threading. Until the torsional deformation rotation of the spindle shaft reaches the prescribed value during a vehicle emergency, the winding drum is allowed to rotate relative to the part near the other end of the spindle shaft, allowing torsional deformation of the spindle shaft, and when the torsional deformation rotation reaches the prescribed value, the female threading and male threading of the threaded-connection mechanism are coupled so as to be unable to rotate relative to each other, making it possible to couple the part near the other end of the spindle shaft and the winding drum so that they cannot rotate with respect to each other.

Also, in the coupling mechanism it is desirable to have a threaded-connection mechanism having female threading formed on one side of the winding shaft and a ratchet wheel that constitute part of the emergency locking means that nonrotatably locks the part near the other end of the spindle shaft when a vehicle emergency occurs, and male threading formed on the other side. Until the torsional deformation rotation of the spindle shaft reaches the prescribed value during a vehicle emergency, the winding drum is allowed to rotate relative to the ratchet wheel, allowing torsional deformation of the spindle shaft, and when the torsional deformation rotation reaches the prescribed value, the female threading and male threading of the threaded-connection mechanism are coupled so as to be unable to rotate relative to each other, making it possible to couple the part near the other end of the spindle shaft and the winding drum via the ratchet wheel so that they cannot rotate with respect to each other.

It is desirable to constitute the coupling mechanism so that the part near the other end of the spindle shaft and the winding drum are coupled by putting the part near the other end of the spindle shaft and the winding drum in contact with each other. When the torsional deformation rotation reaches the prescribed value during a vehicle emergency, the part near the other end of the spindle shaft and the winding drum come into contact with each other, and the part near the other end of the spindle shaft and the winding drum are coupled securely.

It is desirable to constitute the coupling mechanism so that it couples the part near the other end of the spindle shaft and the winding drum by bringing a ratchet wheel and the winding drum into contact with each other. When the torsional deformation rotation reaches the prescribed value during a vehicle emergency, the ratchet wheel and the winding drum come into contact with each other, and the part near the other end of the spindle shaft and the winding drum are securely coupled via the ratchet wheel.

It is desirable to provide in the coupling mechanism a ring member that is thread-connected on the outside with the part near the other end of the spindle shaft, and that fits inside nonrotatably with respect to the winding drum. Until the torsional deformation rotation of the spindle shaft reaches the prescribed value during a vehicle emergency, the ring member, together with the winding drum, is allowed to rotate relative to the spindle shaft and deformation of the spindle shaft is allowed, and when the torsional deformation rotation reaches the prescribed value, the ring member is coupled to the part near the other end of the spindle shaft so that they are unable to rotate relative to each other, and it is possible, via the ring member, to couple the part near the other end of the spindle shaft and the winding drum so that they are unable to rotate relative to each other.

It is desirable to provide in the coupling mechanism a ring member that is thread-connected on the outside with a ratchet wheel that constitutes part of an emergency locking means that nonrotatably locks the part near the other end of the spindle shaft during a vehicle emergency, and that fits inside nonrotatably with respect to the winding drum. Until the torsional deformation rotation of the spindle shaft reaches the prescribed value during a vehicle emergency, the ring member, together with the winding drum, is allowed to rotate relative to the ratchet wheel and deformation of the spindle shaft is allowed, and when the torsional deformation rotation reaches the prescribed value, the ring member is coupled to the ratchet wheel so that they are unable to rotate relative to each other, and it is possible, via the ring member and the ratchet wheel, to couple the part near the other end of the spindle shaft and the winding drum so that they are unable to rotate relative to each other.

It is desirable to constitute the outer perimeter of the ring member in spline form and to spline-couple the ring member to the winding drum. When the ring member rotates relative to the spindle shaft or ratchet wheel, movement of the ring member toward the center of the shaft as referred to above, and extension and contraction of the spindle shaft due to torsional deformation can also be allowed. And because the ring member can be made small enough to securely fit inside the winding drum, the coupling mechanism can be made small, and because, after coupling of the ring member, the load from the winding drum can be input to the ring member by dispersing it through the multiple spline teeth of the ring member, this ring member makes it possible to surely catch the load and make the winding drum nonrotatable.

It is desirable to fit the ring member inside the winding drum so that it can move relatively toward its shaft center. When the ring member rotates with respect to the spindle shaft or ratchet wheel, movement of the ring member in the shaft-center direction can be allowed, and expansion and contraction due to torsional deformation of the spindle shaft can also be allowed.

It is desirable to constitute the coupling mechanism so that the part near the other end of the spindle shaft and the winding drum are coupled by bringing the ring member into contact with the winding drum. When the torsional deformation rotation reaches the prescribed value during a vehicle emergency, the ring member and the winding drum come into contact with each other, and the part near the other end of the spindle shaft and the winding drum are securely coupled via the ring member.

It is desirable to constitute the coupling mechanism so that the part near the other end of the spindle shaft and the winding drum are coupled by bringing the ring member into contact with the ratchet wheel. When the torsional deformation rotation reaches the prescribed value during a vehicle emergency, the ring member and the ratchet wheel come into contact with each other, and the part near the other end of the spindle shaft and the winding drum are securely coupled via the ring member and ratchet wheel.

Briefly stated, the present invention provides a seat belt retractor, a coupling mechanism is provided that allows torsional deformation of spindle shaft when a vehicle emergency occurs until the torsional deformation rotation of the left end of spindle shaft with respect to the part near its right end reaches a prescribed value, and when the torsional deformation rotation reaches the prescribed value, it couples the part near the right end of spindle shaft and winding drum so that they cannot rotate relative to each other, and the composition has been made such that when a vehicle emergency occurs, the kinetic energy of the passenger is absorbed and ultimately the passenger is securely restrained by the webbing.

According to an embodiment of the invention, there is provided a seat belt retractor comprising: a winding drum for winding a webbing; a torsionally deformable spindle shaft having a first end and a second end; the first end being nonrotatably connected to the winding drum; means for torsional deforming the spindle shaft during a vehicle emergency; and a coupling means for nonrotatably coupling the second end with the winding drum when a preset limit of torsional deformation between the first and second end is reached.

According to another embodiment of the invention, there is provided a seat belt retractor comprising: a winding drum for winding a webbing; a torsionally deformable spindle shaft having a first end and a second end; the spindle shaft being longitudinally fitted through the winding drum; the first end being nonrotatably connected to the winding drum; emergency locking mechanism for nonrotatably fixing the second end of the spindle shaft during a vehicle emergency; means for torsionally deforming the spindle shaft during the vehicle emergency; and a coupling means for nonrotatably coupling the second end with the winding drum when a preset limit of torsional deformation between the first and second end is reached.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

This embodiment is an example in the case where this invention is applied to a seat belt retractor that absorbs energy through the torsional deformation of a spindle shaft that functions as a torsion bar, during a vehicle emergency such as a vehicle collision. The front and rear and left and right in FIG. 1 is described as the front and rear and left and right.

Figure 1:
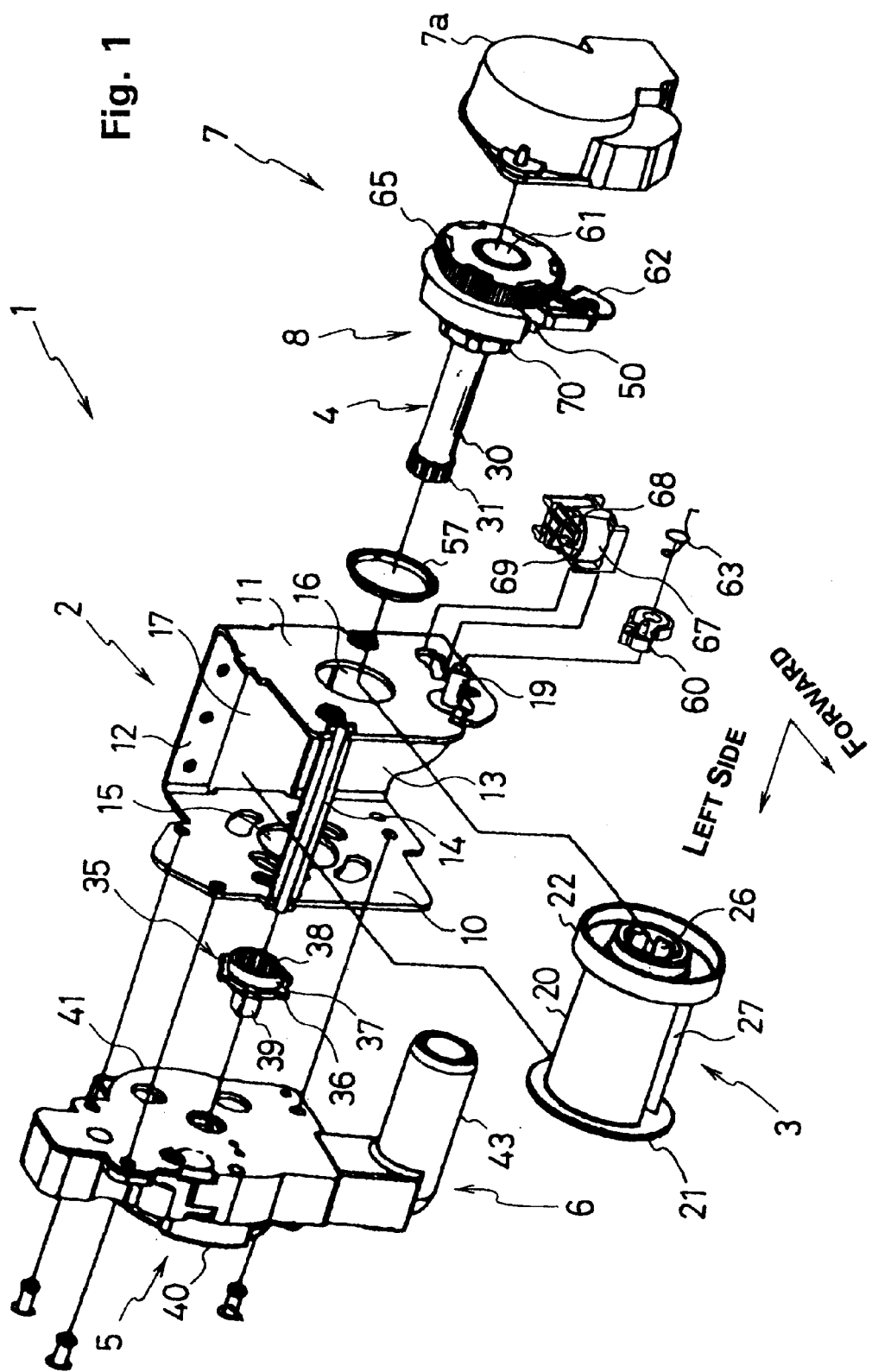
FIG. 1 is an exploded perspective view of the seat belt retractor relating to an embodiment of this invention.
Figure 2:
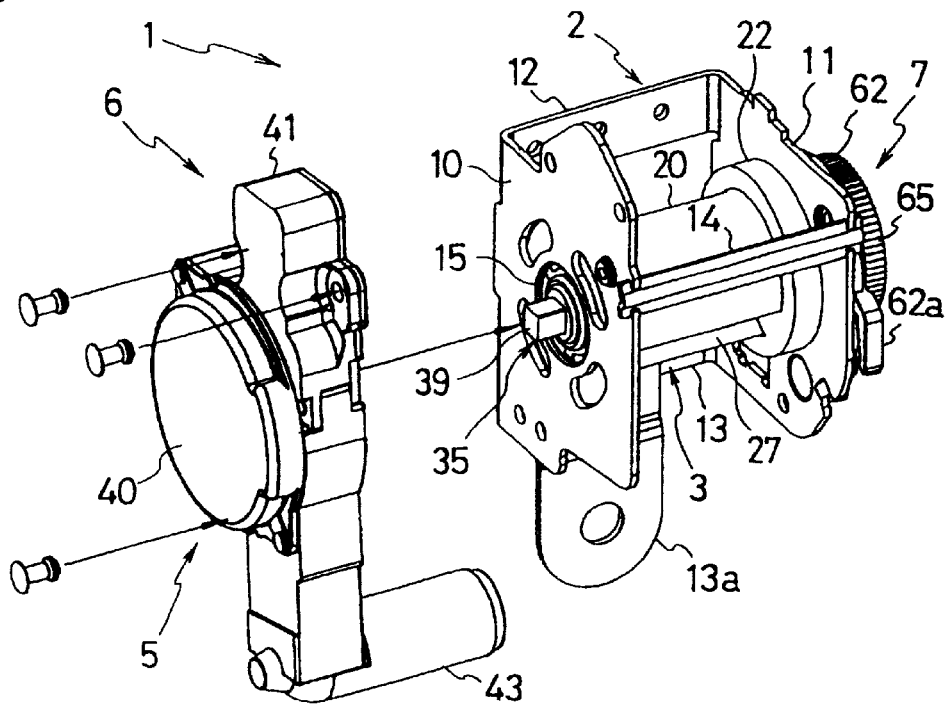
FIG. 2 is a perspective view of the seat belt retractor from the upper left.
Figure 3:
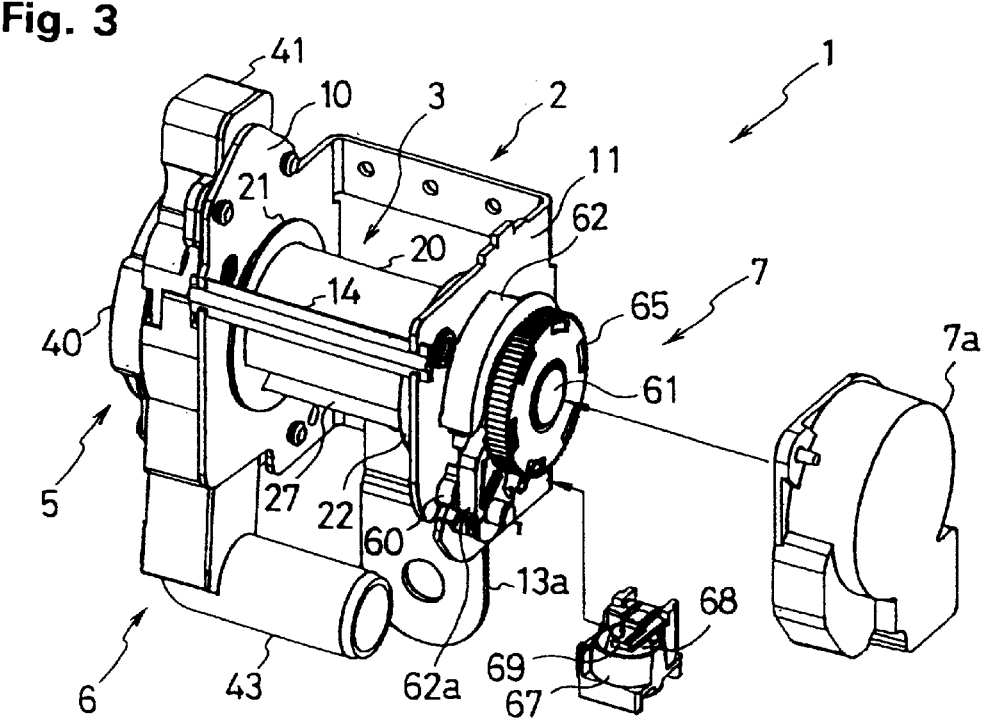
FIG. 3 is a perspective view of the seat belt retractor from the upper right.

As shown in FIGS. 1 through 3, seat belt retractor 1 has metal housing 2, which is secured to the body of the vehicle; winding drum 3, which is mounted on housing 2 and on which webbing W is wound; spindle shaft 4, which is arranged so as to go through winding drum 3 and whose left end engages with winding drum 3 so not to be mutually rotatable; rotation impelling mechanism 5, which at all times urges winding drum 3 to rotate in the wind-up direction; forced winding mechanism 6, which during a vehicle collision or other vehicle emergency forcible causes winding drum 3 to rotate in the wind-up direction and winds webbing W; emergency locking mechanism 7, which during a vehicle emergency nonrotatably locks the part near the right end of spindle shaft 4; and coupling mechanism 8, which allows torsional deformation of spindle shaft 4 until the torsional deformation rotation of the left end of spindle shaft 4 with respect to the part near its right end reaches a prescribed value in a vehicle emergency and which, when the torsional deformation rotation reaches the prescribed value, couples the part near the right end of spindle shaft 4 and winding drum 3 so that they are unable to rotate relative to each other.

As shown in FIGS. 1 through 3, housing 2 is formed integrally from left-side wall 10, right-side wall 11, rear wall part 12, which joins the upper rear ends of left-side wall 10 and right-side wall 11, and joining plate part 13, which joins the lower rear parts of left-side wall 10 and right-side wall 11; and attachment plate 13a, which is securely attached to rear wall part 12 and extends downward, is joined to the body of the vehicle by bolts, etc. The upper front ends of left-side wall 10 and right-side wall 11 are joined to bar member 14, which is in a left-right orientation.

Circular openings 15 and 16, whose diameter is smaller than that of winding drum 3, are formed coaxially in left-side wall 10 and right-side wall 11, and mounted on the lower part of the right surface of right-side wall 11 are pawl 60 and holder 67 of emergency locking mechanism 7. Formed between rear-side wall 12 and joining plate part 13 is rectangular opening 17, and although not shown, when almost all of webbing W is wound onto winding drum 3, the rear-end part of webbing W, whose diameter has grown large, is retracted inside opening 17 so that there is no mutual interference with housing 2.

As shown in FIGS. 1 through 3 and FIGS. 5 through 7, winding drum 3 has barrel part 20, onto whose outer circumference webbing W is wound, left flange 21, and right flange-shaped part 22, and formed in its central axis part is piercing hole 23, which is in left-right orientation and which spindle shaft 4 pierces. Formed on left flange 21 is spline hole 24, and formed on the left-end part of winding drum 3 is insertion hole 25, which aligns with piercing hole 23 and spline hole 24 and whose diameter is larger than that of piercing hole 23.

Right flange-shaped part 22 is formed wide on left and right, and formed in its middle part is spline-shaped fitting bole 26, which aligns with piercing hole 23 and whose diameter is larger than that of piercing hole 23; fitted into this fitting hole 26 is ring member 70 of coupling mechanism 8 so that it cannot rotate relatively and can move relatively left and right. Formed in barrel part 20 is webbing piercing opening 27 for fitting and anchoring the base end of webbing W.

As shown in FIG. 1 and in FIGS. 4 through 7, spindle shaft 4 is formed integrally from torsion bar part 30, which torsionally deforms when torsional torque greater than a prescribed value acts on it, knurled shaft part 31 on the left end of torsion bar part 30, spline shaft part 32 on the right end of torsion bar part 30; knurled shaft part 31, via cap member 35, engages with the left end of winding drum 3 so as to be mutually nonrotatable, and coupled mutually non-rotatably to spline shaft part 32 is ratchet wheel 50 of emergency locking mechanism 7.

Cap member 35 has spline-shaped engaging part 36, cylinder 37, which extends rightward from engaging part 36, and knurled hole part 38, which is formed on the inside of cylinder 37; engaging part 36 engages with spline hole 24 of winding drum 3, cylinder 37 fits inside insertion hole 25, and knurled shaft part 31 of spindle shaft 4 engages with knurled hole part 38. Also, formed integrally with cap member 35 is coupling shaft part 39, which has a square cross-section and extends leftward from engaging part 36; this coupling shaft part 39 is coupled dynamically to forced winding mechanism 6 and rotation impelling mechanism 5.

And although not shown, the cylinder-shaped part of base end part of webbing W fits around torsion bar part 30 of spindle shaft 4, and webbing W extends from torsion bar part 30 through webbing insertion opening 27 in barrel part 20 of winding drum 3 and is attached to barrel part 20.

As shown in FIGS. 1 through 3, rotation impelling mechanism 5 has a flat spiral spring that impels coupling shaft part 39 in the wind-up direction, being a flat spiral spring (not shown) housed inside spring accommodation cap 40, which is anchored to casing 41 of forced winding mechanism 6, and forced winding mechanism 6 has gas generator 43, which generates pressurized gas when a vehicle emergency occurs, and a gas pressure drive mechanism (not shown) that causes winding drum 3 to rotate in the wind-up direction via cap member 35 by the gas pressure generated by gas generator 43. A detailed description of rotation impelling mechanism 5 and forced winding mechanism 6 is omitted, because such mechanisms are well known.

We describe the emergency locking mechanism 7. As shown in FIGS. 1 through 4, emergency locking mechanism 7 has ratchet wheel 50, which is coupled to spline shaft part 32 of spindle shaft 4 so that they cannot rotate relative to each other; a first locking mechanism, which responds to the sudden pullout of webbing W and locks the rotation of ratchet wheel 50; and a second locking mechanism, which responds to the sudden deceleration when a vehicle emergency occurs and locks the rotation of ratchet wheel 50. Also, emergency locking mechanism 7 is covered by cover member 7a, which is secured to right-side wall 11 of housing 2.

Figure 4:
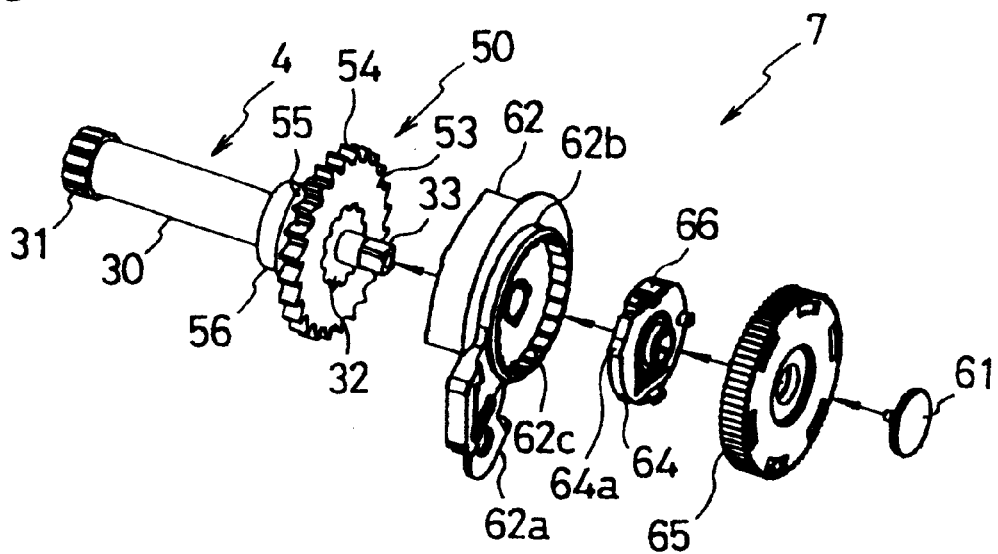
FIG. 4 is a perspective view of the main parts of the seat belt retractor.
Figure 5:
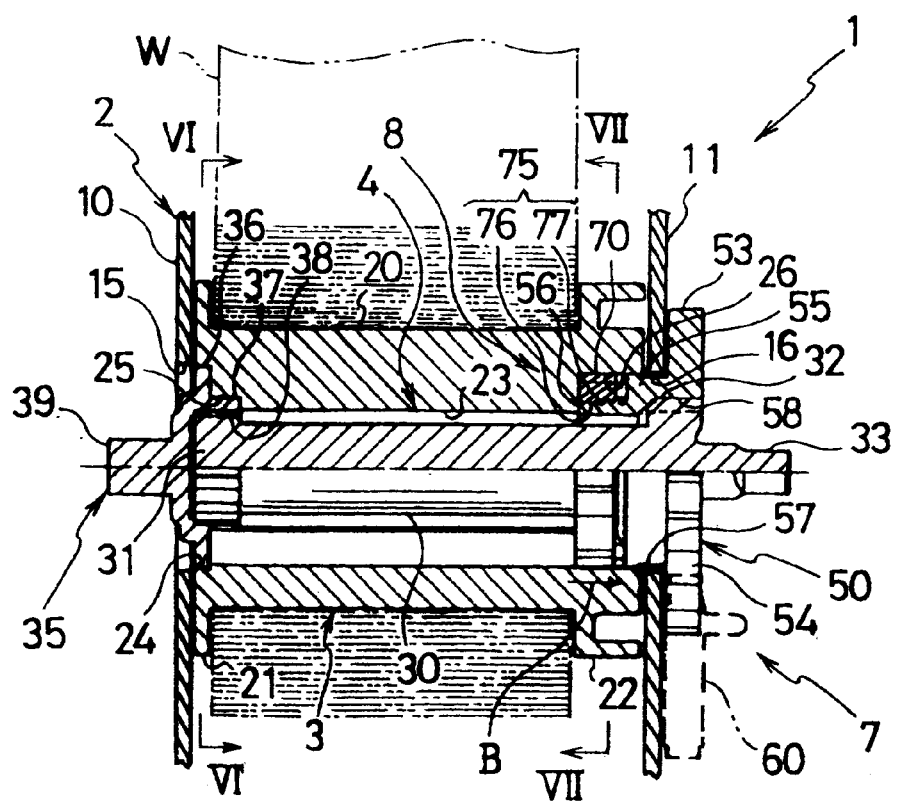
FIG. 5 is a cross-sectional view of the main parts of the seat belt retractor.
Figure 6:
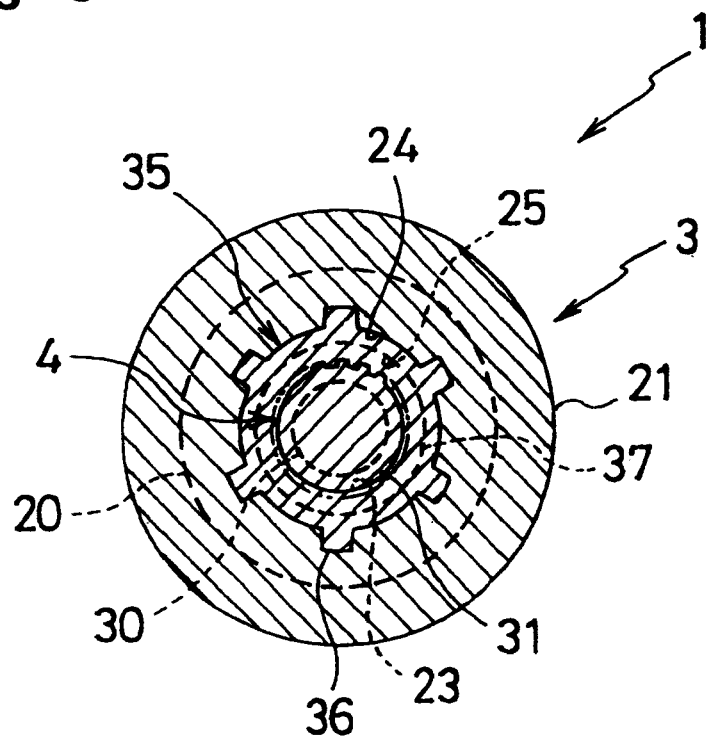
FIG. 6 is a cross-sectional view of FIG. 5 along line VI—VI.

As shown in FIGS. 4 and 5, ratchet wheel 50 is formed integrally from gear part 53, around whose circumference is formed ratchet gear 54; guide part 55, whose diameter is smaller than that of gear part 53 and which is provided on the left side of gear part 53; and cylinder 56, whose diameter is smaller than that of guide part 55 and which extends leftward from guide part 55; and spline shaft part 32 of spindle shaft 4 engages with spline hole 58, which is formed in gear part 53 and guide part 55. Gear part 53 is arranged on the right side of right-side wall 11 of housing 2, and guide part 55 is supported rotatably, via ring-shaped bearing 57, which is made of synthetic resin, on the circumferential surface part of circular opening 16 formed in right-side wall 11, and ring member 70 is thread-connected on the outside with cylinder 56.

The first locking mechanism includes pawl 60, which is pivotally supported rotatably on shaft part 19, which is fixed to right-side wall 11 of housing 2 and which can engage with ratchet gear 54; clutch member 62, which is pivotally supported on coupling shaft part 33 of spindle shaft 4 and in which is formed guide part 62a, which guides pawl 60 in the engaging-disengaging direction with respect ratchet gear 54; lock arm base 66, which is coupled to coupling shaft part 33 and is accommodated in cylinder 62b of clutch member 62; lock arm 64, which is supported rockably in this lock arm base 66 and on which is formed projection 64a, which engages with inner teeth 62c formed inside cylinder 62b of clutch member 62, and which normally is impelled in the direction so that this projection 64a does not engage with inner teeth 62c; locking gear 65, which is pivotally supported on coupling shaft part 33 and is prevented from coming out by rivet 61; and a lock arm guide (not shown) that makes contact with lock arm 64 and is frictionally connected to locking gear 65.

In the normal state, pawl 60 is rotationally impelled by torsion spring 63 into a non-engaged position in which it does not engage with ratchet gear 54, and when webbing W is suddenly pulled out and coupling shaft part 33 rotates, a rotation delay in locking gear 65 arises with respect to lock arm base 66, a rotation delay also arises in the lock arm guide, and as a result, lock arm 64 rotates against the force of the spring, and its projection 64a engages with inner teeth 62c. Then clutch member 62 rotates and is guided by guide part 62a of clutch member 62, pawl 60 rotates against the impelling force of torsion spring 63 and engages with ratchet gear 54, and together with ratchet wheel 50 the rotation of spline shaft part 32 of spindle shaft 4 is locked.

The second locking mechanism has—on the right side of pawl 60, clutch member 62, lock arm base 66, lock arm 64, and lock arm 64, which it shares with the first locking mechanism—locking gear 65, which is pivotally supported on coupling shaft part 33 and is prevented from coming out by rivet 61; holder 67, which is fixed to right-side wall 10 of housing 2; spherical inertial mass 68, which is accommodated in holder 67; and rocking lever 69 which is rockably coupled to holder 67 and can engage with locking gear 65.

In the normal state, locking gear 65 rotates integrally with coupling shaft part 33 of spindle shaft 4 via frictional force, and when the vehicle suddenly decelerates, inertial mass 68, which is accommodated in holder 67, moves, rocking lever 69 rocks and engages with rocking gear 65, and the rotation of rocking gear 65 is locked. Then, by the relative rotation of lock arm 64 with respect to the lock arm guide of locking gear 65, its projection 64a engages with inner teeth 62c, clutch member 62 rotates, and, as described above, together with ratchet wheel 50 the rotation of spline shaft part 32 of spindle shaft 4 is locked.

We describe the coupling mechanism 8. As shown in FIGS. 1, 5, and 7 through 9, coupling mechanism 8 has ring member 70, which is thread-connected on the outside, via threaded-connection mechanism 75, with cylinder 56 of ratchet wheel 50, which is coupled to spline shaft part 32 of spindle shaft 4 so that they cannot rotate relative to each other. The outer circumference of this ring member 70 is constituted in a spline shape, and ring member 70 fits into fitting hole 26 of winding drum 3 and is spline-coupled so that it cannot rotate relative to winding drum 3 and can move relative to its shaft-center direction (the left-right direction).

Figure 7:
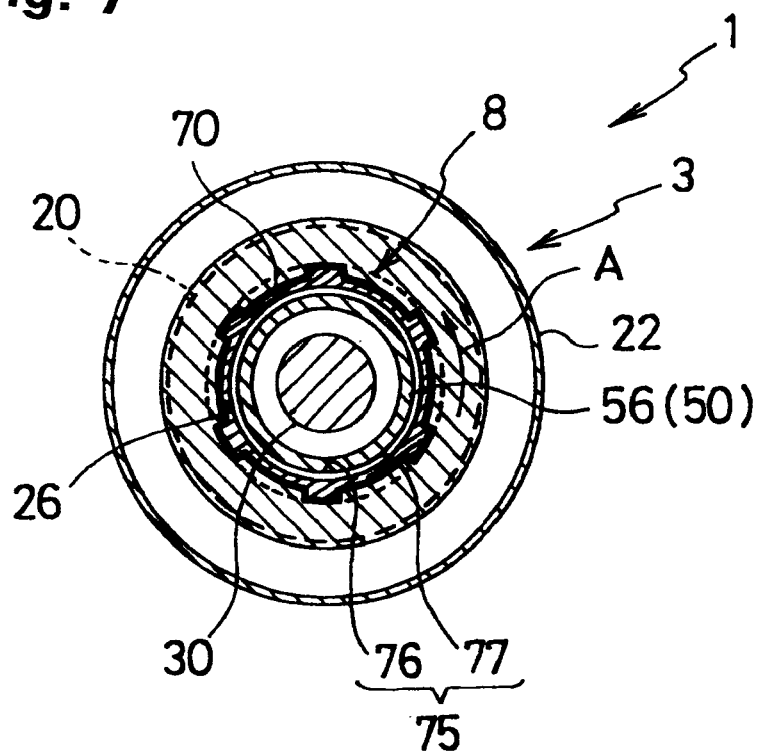
FIG. 7 is a cross-sectional view of FIG. 5 along VII—VII.
Figure 8:
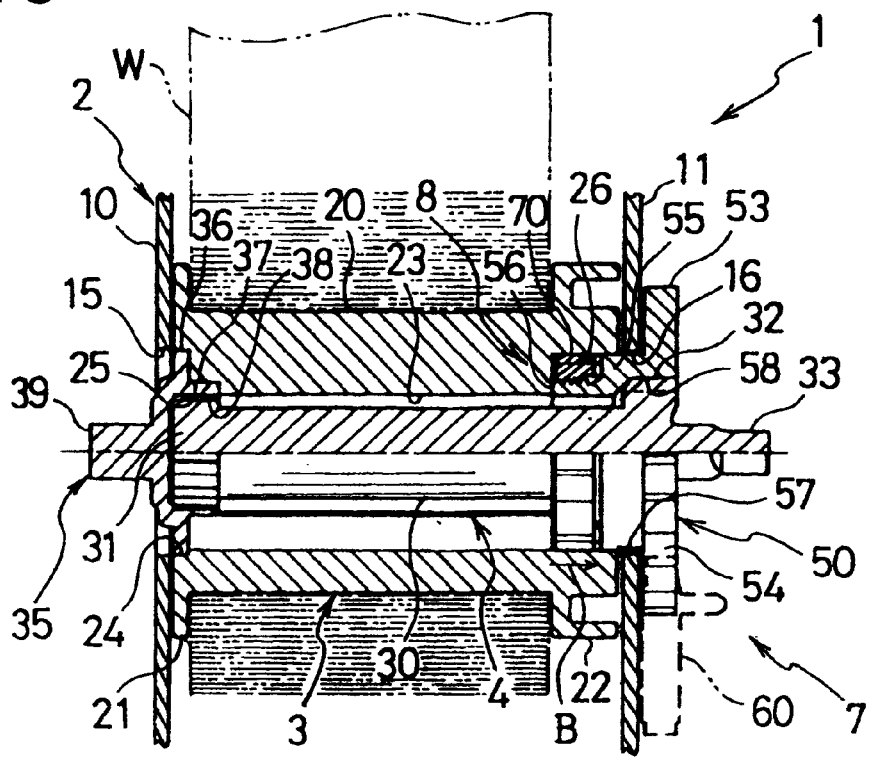
FIG. 8 is a cross-sectional view of the main parts of the seat belt retractor.
Figure 9:
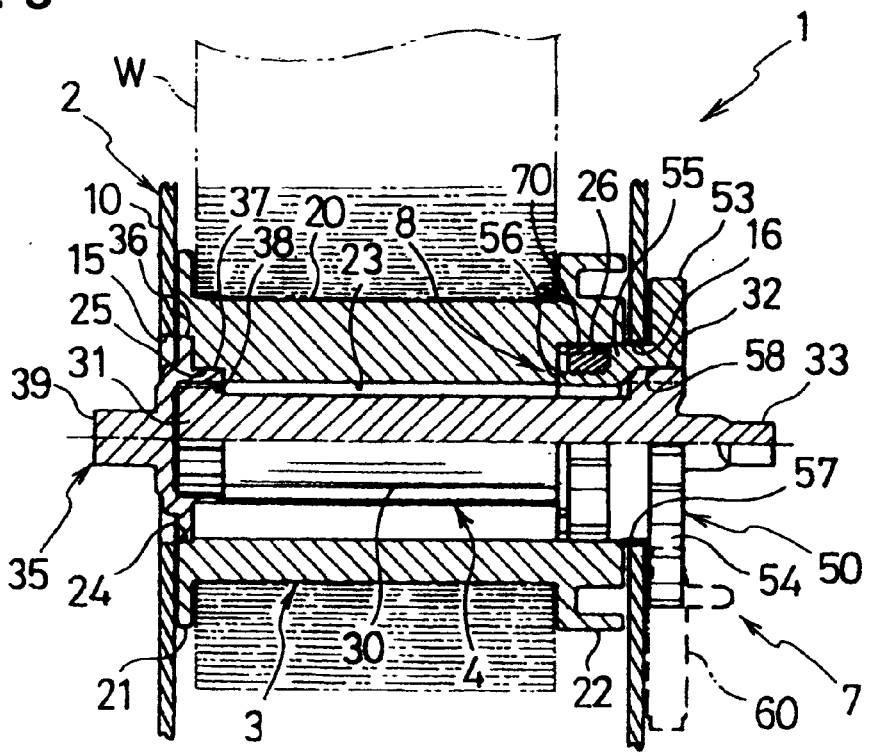
FIG. 9 is a cross-sectional view of the main parts of the seat belt retractor.

The threaded-connection mechanism 75 consists of female threading 76, which is formed on the inside circumference of ring member 70, and male threading 77, which is formed on the outside circumference of cylinder 56 of ratchet wheel 50 and threads into female threading 76; male threading 77 of cylinder 56 and female threading 76 of ring member 70 are formed into positive threading, and when ring member 70 rotates with respect to cylinder 56 in the direction indicated by arrow A in FIG. 7, it moves in the left-right direction indicated by arrow B in FIGS. 5 and 8, and as shown in FIG. 9, the right end face of ring member 70 comes into contact with the left end face of guide part 55 of ratchet wheel 50, and ring member 70 and cylinder part 56 are made integral and become unable to rotate relative to each other.

This coupling mechanism 8 is constructed so that when a vehicle emergency occurs, until the torsional deformation rotation of knurled shaft part 31 of spindle shaft 4 with respect to spline shaft part 32 reaches the prescribed value at which the rotation of the ring member 70 becomes impossible, torsional deformation of torsion bar part 30 of spindle shaft 4 is allowed, and when the torsional deformation rotation reaches the prescribed value, spline shaft part 32 of spindle shaft 4 and winding drum 3 are coupled nonrotatably relative to one another via ring member 70 and ratchet wheel 50.

Here, the number of revolutions that ring member 70 can rotate with respect to cylinder 56 until the right end face of ring member 70 comes into contact with the left end face of guide part 55, that is, the torsional deformation rotation, can be set simply by beginning from the state in which the right end face of ring member 70 is in contact with the left end face of guide part 55, then causing ring member 70 to rotate the desired number of rotations in the reverse direction from the above. In this case, so that ring member 70 does not rotate too easily, it is desirable to apply a resin coating to cylinder 56 so that frictional force acts to a certain extent between cylinder 56 and ring member 70.

Figure 10:
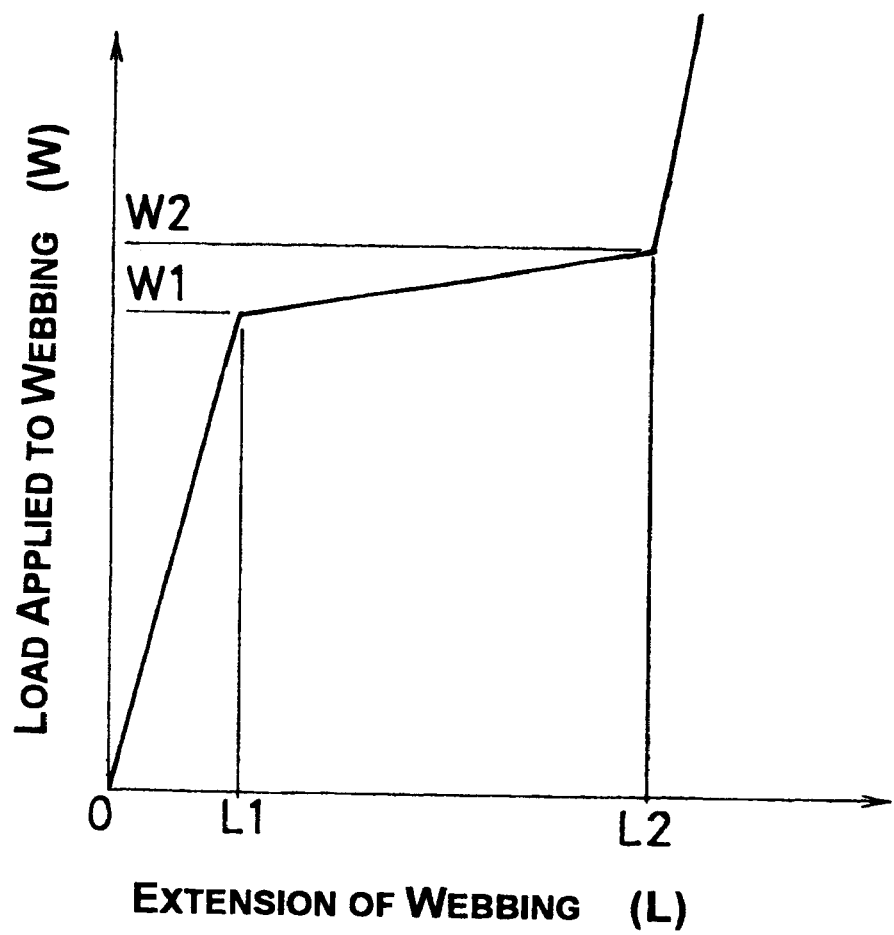
FIG. 10 is a diagram of the load characteristics acting on the webbing.

Next, we describe the operation of seat belt retractor 1, referring to the load characteristics that operate on webbing W in FIG. 10. In the normal state, emergency locking mechanism 7 does not operate, so webbing W can be freely pulled out from winding drum 3 and put against the pelvis and chest of the passenger sitting in the seat.

In the state in which webbing W is against the body of the passenger, when a vehicle collision or other vehicle emergency occurs, forced winding mechanism 6 forcibly causes winding drum 3 to rotate in the wind-up direction, winding slack webbing W into winding drum 3 and tightening it, emergency locking mechanism 7 locks spline shaft part 32 of spindle shaft 4 nonrotatably, then, after webbing W is wound tighter on winding drum 3, webbing W is payed out, and the load acting on webbing W increases.

Then, when the extension of webbing W reaches L1 and the load acting on webbing W reaches the prescribed W1, torsion bar part 30 of spindle shaft 4 undergoes torsional deformation, knurled shaft part 31, together with winding drum 3, rotates with respect to spline shaft part 32, which is locked by spindle shaft 4, the kinetic energy of the passenger is absorbed by the torsional deformation of torsion bar part 30, and webbing W pays out while the load on the passenger from webbing W gradually increases from W1. At this time, ring member 70, which rotates together with winding drum 3, moves rightward through the state of FIG. 8.

Normally, all kinetic energy is absorbed before the webbing extension reaches L2. But if the load acting on webbing W reaches W2 and the torsional deformation rotation of torsion bar part 30 of spindle shaft 4 reaches the prescribed value, then as shown in FIG. 9, the right end face of ring member 70 comes into contact with the left end face of guide part 55, ring member 70 and ratchet wheel 50 become integral, spline shaft part 32 becomes coupled via ratchet wheel 50 and ring member 70 with winding drum 3 so that they cannot rotate relative to each other, and breakage of torsion bar part 30 is prevented. In this way, winding drum 3 is completely restrained from rotation, payout of webbing W is prevented, and the passenger is securely restrained by webbing W.

Thus with the seat belt retractor 1, because coupling mechanism 8 is provided, after operation of emergency locking mechanism 7, torsional deformation of torsion bar part 30 is allowed until the torsional deformation rotation of knurled shaft part 31 of spindle shaft 4 in the webbing pullout direction with respect to spline shaft part 32 reaches the prescribed value, and when the torsional deformation rotation reaches the prescribed value, spline shaft part 32 of spindle shaft 4 and winding drum 3 can be coupled so that they cannot rotate relative to each other.

As a result, if during a vehicle emergency a large load acts on webbing W, or even if the vehicle collides several times at once and spindle shaft 4 is deformed repeatedly, the kinetic energy of the passenger will be absorbed and breakage of spindle shaft 4 will be surely prevented, and ultimately the passenger will be securely restrained by webbing W, thereby surely preventing the passenger from being involved in secondary collisions, such as with the steering wheel or windshield, making it possible to ensure the safety of the passenger. Loads W1 and W2 can be appropriately set by appropriately designing torsion bar part 30 to have the appropriate length, diameter, material, and allowed value of torsional deformation rotation (the prescribed value), etc.

Moreover, the operation can be surely realized with a simple structure because coupling mechanism 8 has ring member 70, which is thread-connected on the outside with cylinder 56 of ratchet wheel 50, which is coupled to spline shaft part 32 of spindle shaft 3, and whose outer circumference part is constructed in spline shape and fits into and is spline-coupled with winding drum 3 so that they cannot rotate relative to each other; and because ring member 70 fits into winding drum 3 in its shaft-center direction so that they cannot rotate relative to each other, when ring member 70 rotates relative to ratchet wheel 50, rightward movement of ring member 70 can be allowed, and extension and compression due to torsional deformation of spindle shaft 4 can also be allowed.

Because the outer circumference part of ring member 70 is constructed in spline shape and ring member 70 is spline-coupled to winding drum 3, ring member 70 can be made small and can be surely assembled inside winding drum 3, so coupling mechanism 8 can be made small; moreover, after coupling of ring member 70, the load from winding drum 3 can be input to ring member 70 dispersed via the multiple spline teeth of ring member 70, so the load can be surely caught by this ring member 70 and winding drum 3 can be made nonrotatable.

In addition, because coupling mechanism 8 couples spline shaft part 32 of spindle shaft 4 and winding drum 3 by causing ring member 70 to come into contact with ratchet wheel 50, when the torsion deformation rotation reaches the prescribed value during a vehicle emergency, ring member 70 and ratchet wheel 50 are brought into contact with each other, and spline shaft part 32 of the spindle shaft and winding drum 3 can be more surely coupled via ring member 70 and ratchet wheel 50.

Moreover, the construction may be such that in coupling mechanism 8 of this seat belt retractor 1, the threading of cylinder 56 of ratchet wheel 50 and ring member 70 is formed in reverse threading, and when ring member 70 rotates with respect to cylinder 56 in the direction indicated by arrow A in FIG. 7, by moving ring member 70 leftward and bringing it into contact with winding drum 3, spline shaft part 32 of spindle shaft 4 and winding drum 3 are coupled via ring member 70 and ratchet wheel 50.

Next, we describe modified embodiments in which the embodiment is partially modified. In the description, parts that are the same as in the embodiment are labeled with the same symbol.

Figure 11:
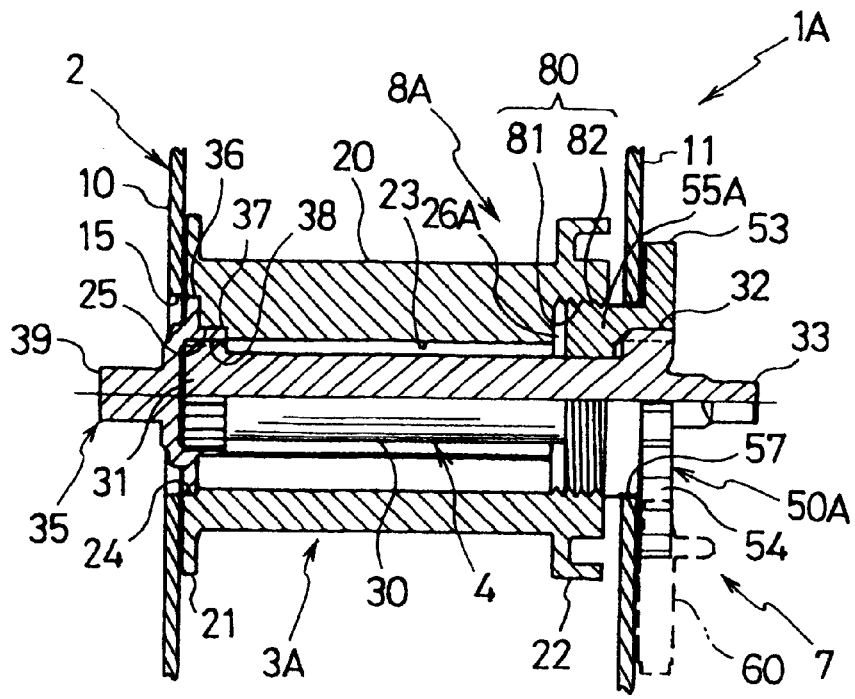
FIG. 11 is a cross-sectional view of the main parts of the seat belt retractor of modified embodiment 1.

1) Modified embodiment 1 . . . see FIG. 11.

This seat belt retractor 1A is constructed so that, in coupling mechanism 8A, it has a thread-connection mechanism 80 that has female threading 81 formed in winding drum 3A and male threading 82 formed on ratchet wheel 50A, that is coupled with the part near the right end of spindle shaft 4 so that they cannot rotate relative to each other, and that threads with female threading 81, and by causing ratchet wheel 50A and winding drum 3A to come into contact with each other, spline shaft part 32 of spindle shaft 4 and winding drum 3A are coupled via ratchet wheel 50A.

On right flange-shaped part 22 of winding drum 3A, fitting hole 26A is formed in its middle part and female threading 81 is formed on the circumferential surface part of this fitting hole 26A; on ratchet wheel 50A, guide part 55A is formed integrally with its diameter smaller than that of its gear part 53 and on the left side of gear part 53; male threading 82 is formed on the left side of its guide part 55A; and the inside end face of fitting hole 26A and the left end face of guide part 55A are able to come into contact with each other.

With this seat belt retractor 1A, approximately the same action and effect is performed as in the previous embodiment, but compared with that embodiment, ring member 70 can be omitted, simplifying its structure, which is advantageous for assembly and reduces the cost of making it. And because spline shaft part 32 of spindle shaft 4 and ratchet wheel 50 can move relative to each other in the left-right direction, expansion and contraction due to the torsional deformation of spindle shaft 4 can be allowed.

Figure 12:
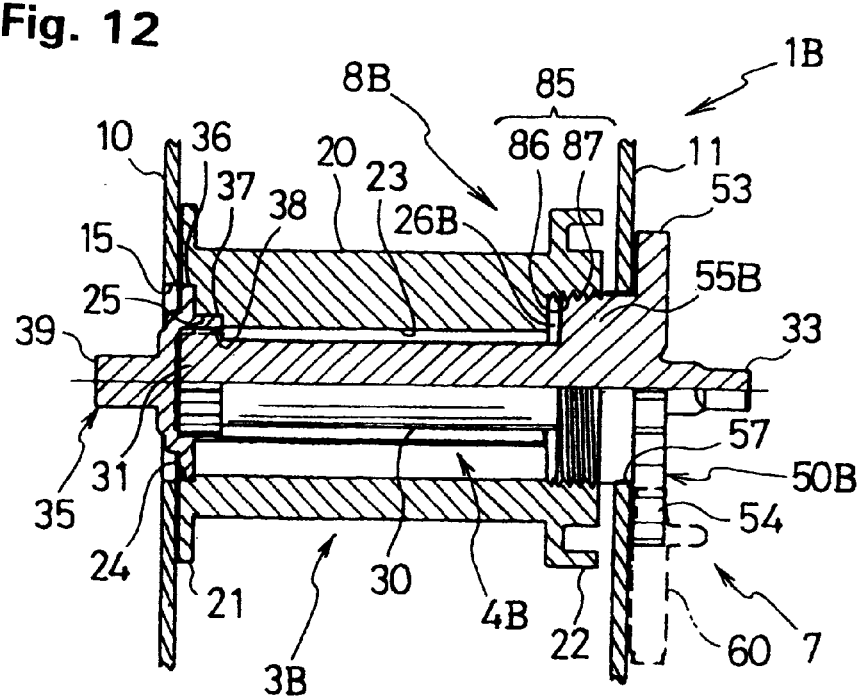
FIG. 12 a cross-sectional view of the main parts of the seat belt retractor of modified embodiment 2.

2) Modified embodiment 2 . . . see FIG. 12.

This seat belt retractor 1B is constructed so that, in coupling mechanism 8B, it has a thread-connection mechanism 85 that has female threading 86 formed in winding drum 3B and male threading 87 formed on the part near the other end of spindle shaft 4B that threads with female threading 86; spindle shaft 4B and ratchet wheel 50B are formed integrally; and by causing the part near the right end of spindle shaft 4B and winding drum 3B to come into contact with each other, the part near the right end of spindle shaft 4B and winding drum 3B are coupled.

On right flange-shaped part 22 of winding drum 3B, fitting hole 26B is formed in its middle part and female threading 86 is formed on the circumferential surface part of this fitting hole 26B; guide part 55B is formed integrally with right end part of spindle shaft 4B; male threading 87 is formed on the left side of its guide part 55B; and the inside end face of fitting hole 26B and the left end face of guide part 55B are able to come into contact with each other. Also, ratchet wheel 50B is formed integrally with spindle shaft 4B on the right side of guide part 55B.

With this seat belt retractor 1B, approximately the same action and effect is performed as in the previous embodiment, but compared with the first separate embodiment, ring member 70 can be omitted and spindle shaft 4B and ratchet wheel 50B are formed integrally, further simplifying its structure, which is advantageous for assembly and reduces the cost of making it.

3) Otherwise, the cap member 35 can be omitted as a structure that engages one end part of the spindle shaft and the winding drum so that they are unable to rotate relative to each other, one end part of the spindle shaft and the winding drum may be made to engage directly, and one end part of the spindle shaft and the winding drum may be made to engage via another coupling member instead of cap member 35.

4) In the emergency locking mechanism that locks the part near the other end of the spindle shaft nonrotatably, various emergency locking mechanisms other than emergency locking mechanism 7 of the embodiment may of course be applied. Also, various structures may of course also be applied in winding drum 3, rotation impelling mechanism 5, forced winding mechanism 6, etc.

Moreover, the seat belt retractor of this invention is not limited to what has been described in the aforementioned embodiments; various modifications that do not deviate from the gist of this invention may be added, and it may be applied to seat belt retractors of various types.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A seat belt retractor comprising:

a winding drum for winding a webbing;

a torsionally deformable spindle shaft having a first end and a second end;

a cap nonrotably connecting said first end to said winding drum;

means for torsional deforming said spindle shaft during a vehicle emergency;

coupling means for nonrotatably coupling said second end with said winding drum when a preset limit of torsional deformation between said first and second end is reached.

said coupling means includes a thread-connection mechanism having a female threaded section formed on an inner surface of said winding drum and a male threaded section on an outer surface of said second end of said spindle shaft; and said female threaded section threaded in said male threaded section.

2. A seat belt retractor according to claim 1 wherein:

said coupling means couples a part near said second end of said spindle shaft and said winding drum by causing said part near said second end of said spindle shaft and said winding drum to come in to contact with each other.

3. A seat belt retractor according to claim 1, wherein:

said coupling means couples a part near said second end of said spindle shaft and said winding drum by causing said ratchet wheel and said winding drum to come into contact with each other.

4. A seat belt retractor comprising:

a winding drum for winding a webbing;

a torsionally deformable spindle shaft having a first end and a second end;

a cap nonrotatably connecting said first end to said winding drum;

emergency locking mechanism for nontotably fixing said second end of said spindle shaft during a vehicle emergency;

means for torsionally deforming said spindle shaft during a vehicle emergency;

coupling means for nonrotatably coupling said second end with said winding drum when a preset limit of torsional deformation between said first and second end is reached:

said coupling means includes a thread connection mechanism having a female threaded section formed on an inner surface of said winding drum and a male threaded section on an outer surface of said second end of said spindle shaft; and said female threaded section threaded in said male threaded section.

5. A seat belt retractor according to claim 4 wherein:

said coupling means couples a part near said second end of said spindle shaft and said winding drum by causing said part near said second end of said spindle shaft and said winding drum to come in to contact with each other.

6. A seat belt retractor according to claim 4, wherein:

said coupling means couples a part near said second end of said spindle shaft and said winding drum by causing said ratchet wheel and said winding drum to come into contact with each other.

* * * * *